United States Patent [19]

Fickenscher et al.

[11] 4,313,060

[45] Jan. 26, 1982

[54] UNINTERRUPTIBLE POWER SUPPLY WITH LOAD REGULATION OF STANDBY VOLTAGE SOURCE

[75] Inventors: Hermann Fickenscher, Madison; Richard H. Hock, Landing; Richard C. Ray, Randolph Township, Morris County; Rudolph Scuderi, Mountain Lakes, all of N.J.

[73] Assignee: Bell Telephone Laboratories, Incorporated, Murray Hill, N.J.

[21] Appl. No.: 121,750

[22] Filed: Feb. 15, 1980

[51] Int. Cl.³ .............................................. H02J 7/00
[52] U.S. Cl. ..................................... 307/23; 307/66; 307/82; 363/25; 363/37
[58] Field of Search ................. 307/17, 19, 21, 22, 307/44, 45, 46, 48, 72, 25, 26, 23, 66, 82; 363/22–25, 37, 97

[56] References Cited

U.S. PATENT DOCUMENTS 3,573,483  4/1971  White ................................... 307/66
3,925,772  12/1975  Miller et al. ......................... 363/37 X

*Primary Examiner*—L. T. Hix
*Assistant Examiner*—James L. Dwyer
*Attorney, Agent, or Firm*—Alfred G. Steinmetz

[57] ABSTRACT

An uninterruptible power supply utilizes a controlled ferroresonant regulator to derive a regulated DC voltage from a primary AC source. A reserve source of DC power is coupled to the output through a DC voltage regulator which is activated when the DC output voltage of the power supply drops below a predetermined threshold.

8 Claims, 2 Drawing Figures

4,313,060

UNINTERRUPTIBLE POWER SUPPLY WITH LOAD REGULATION OF STANDBY VOLTAGE SOURCE

FIELD OF THE INVENTION

This invention is concerned with uninterruptible power supply systems and, in particular, with a power supply transfer system to completely or partially transfer a load from a primary energy source to a reserve energy source in response to a failure or partial failure of the primary energy source.

BACKGROUND OF THE INVENTION

Communication and data processing circuitry is highly susceptible to variations in commercially supplied electric power. The signal consistency of commercial AC power is frequently unreliable due to variations in user demand and other extraneous disturbances causing power level fluctuations, which may take the form of black outs, brown outs, or transient surges. These signal variations can significantly alter stored data and switching signals in the communication and data processing circuitry and may, in some instances, damage the integrated circuitry contained therein.

It is apparent that communication circuitry and data processing circuitry require a very reliable power source. To provide reliable power and to counteract the susceptibility of this circuitry to commercial power signal variations, uninterruptible power supplies are utilized. An uninterruptible power supply guarantees the continuity of reliable AC and/or DC power regardless of the performance of the primary commercial AC power source.

A commonly used uninterruptible power supply system to supply uninterrupted AC or DC power is the continuous-type, uninterruptible power supply arrangement. A rectifier charger powered by a commercial primary AC power source energizes a continuously operating inverter or converter circuit. The inverter or converter circuit operates continuously to supply the desired output power signal. A continuously charged battery, floated across the output of the rectifier charger, supplies the necessary DC voltage to the inverter or converter should the primary commercial AC power source completely or partially fail. The continuous-type arrangement is very reliable and utilizes very few circuit components; however, such an arrangement is usually limited to line-type regulation and is not responsive to regulate the output signal if load variations occur.

In view of the foregoing, it is desirable to have an uninterruptible power supply to supply load regulated uninterruptible power to a load which may vary.

BRIEF SUMMARY OF THE INVENTION

Therefore in accordance with the principles of the invention, an uninterruptible power supply system has a primary power path comprising, a controlled ferroresonant regulator and rectifier combination supplying independent DC outputs and additionally, driving an inverter from which a plurality of AC and DC outputs are derived. During normal operation, the controlled ferroresonant regulator is responsive to a sensed rectified DC voltage output of the inverter, in this sense operative as a converter, in order to provide load regulation. A reserve DC voltage source is coupled to the power input terminals of the inverter through a series regulator device. Regulation control of this series regulator device is responsive to a rectified DC output voltage of the inverter and is operated to regulate that output at a level slightly less than a level normally obtained in response to the primary power signal. The regulation control of the series regulator device is operative only upon some degradation of the primary power signal.

It is apparent from the foregoing that under normal operating conditions, line and load voltage regulation is provided by the ferroresonant regulator and rectifier combination and upon failure of the primary AC power source, the output of the reserve DC voltage source is regulated in response to the sensed load voltage to insure a continued regulated voltage output.

BRIEF DESCRIPTION OF THE DRAWINGS

An understanding of the invention may be acquired by reference to the description of the following specification accompanied by the drawings in which.

DETAILED DESCRIPTION

Figure 1:
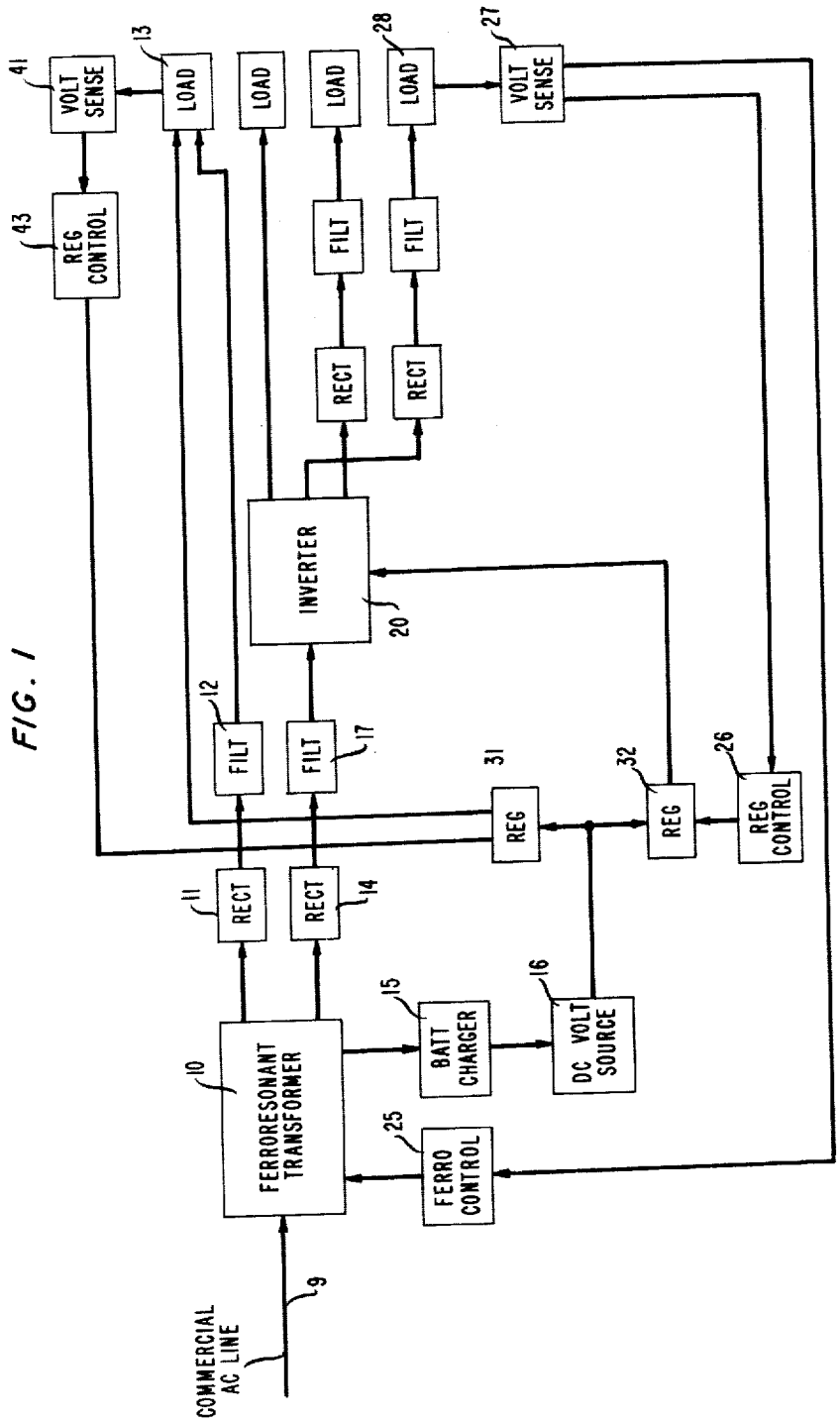
FIG. 1 is a block diagram of a continuous-type uninterruptible power supply utilizing the principles of the invention.

A continuous-type uninterruptible power supply utilizing the principles of the invention is shown in block form in FIG. 1. Commercial AC power is applied to a controlled ferroresonant regulated transformer 10. An output of the ferroresonant transformer 10 is coupled by a rectifier 11 and a filter 12 to a first load 13 to be energized. Ferroresonant transformer 10 is coupled to a second rectifier 14 and filter 17, which in turn, is coupled to supply DC voltage to a power input of an inverter 20. A rectified output of inverter 20 is applied to power a second load 28. An electronic ferro-control 25, responsive to this rectified output, is operative to control simulation of ferroresonant action therein in order to regulate the sensed rectified output.

The controlled ferroresonant regulated transformer 10 disclosed herein as suitable for use in this power supply system is a closed loop feedback controlled ferroresonant transformer in which the ferroresonant action of the transformer is simulated through electronic control supplied through the ferro-control 25. The basic principles of the controlled ferroresonant transformer are disclosed in U.S. Pat. No. Re. 27,917 issued to R. J. Kakalec and assigned to the same assignee as this application. As is well-known to those skilled in the art, a feedback controlled ferroresonant voltage regulator utilizes a semiconductor switch, responsive to an integrated value of the sensed output voltage, to switch inductance into the transformer circuit and simulate saturation of the core. This function is performed herein by the ferro-control 25, responsive to a sensing circuit 27, which monitors the rectified voltage output at a load 28 powered by the inverter circuit 20.

The rectified load voltage output of the inverter 20 at load 28 is controlled by controlling the applied DC power input signal thereto. Under normal operating conditions with the commercial AC signal functioning properly, this regulation is provided by the electronically controlled ferroresonant transformer, whose immediate DC output is regulated in response to the sensed load voltage supplied by inverter 20. An additional output of the ferroresonant transformer 10 is coupled to a controlled charging circuit 15 to provide a steady charge to a reserve DC voltage source 16.

The output of the reserve DC voltage source 16 is coupled through a first regulating circuit 31 to the output load 13 and through a second regulating circuit 32 to supply a DC input voltage to the power input of inverter 20. Regulating circuits 31 and 32 coupling the reserve DC voltage source 16 to the various loads are inoperative when the output voltage of the second load 28 is at its desired regulated value. These regulating circuits 31 and 32 become operative to transmit power from the DC voltage source 16 to the various loads when the voltage at load 28 drops slightly below the desired regulated value indicating a failure or partial failure of the primary AC signal. This lowered voltage, at which output power is supplied by the DC voltage source 16, is selected at a value which is still within a desired regulation band of the output voltage at load 28.

It is apparent from the foregoing, that under normal operating conditions, power flow is from the primary AC signal source through the ferroresonant regulating transformer 10 and the rectifiers 11 and 14 to the various loads. In the case of normal functioning of the primary AC power source, this power flow is transmitted directly to the first load 13 and through an inverter 20 to a second load 28. Upon failure of the primary AC power source, all the output load voltages are supplied from the auxiliary DC voltage source 16 through the first and second regulators 31 and 32 to supply regulated voltage to the first and second loads 13 and 28, respectively, and associated tracking voltages at the other loads.

In this failure mode of operation, wherein commercial AC at input 9 has failed, power is supplied directly from reserve source 16 through the first regulator 31 to the first load 13. The second regulator 32 has its output coupled to the power input of the switching inverter circuit 20. This regulated voltage level, applied to the power input of inverter 20, controls the rectified output voltage level of the inverter at load 28. Output sensing and feedback control circuitry are utilized to regulate the output voltage of each series regulator 31 and 32 in order to supply the desired DC output voltage level at loads 13 and 28. The voltage output of the first regulator 31 is controlled in response to a first voltage sensing circuit 41 and a regulation control circuit 43. Regulation control circuit 26, responsive to sensing circuit 27, generates an error signal used to control the voltage output of regulator 32 in order to regulate the DC voltage at load 28.

Figure 2:
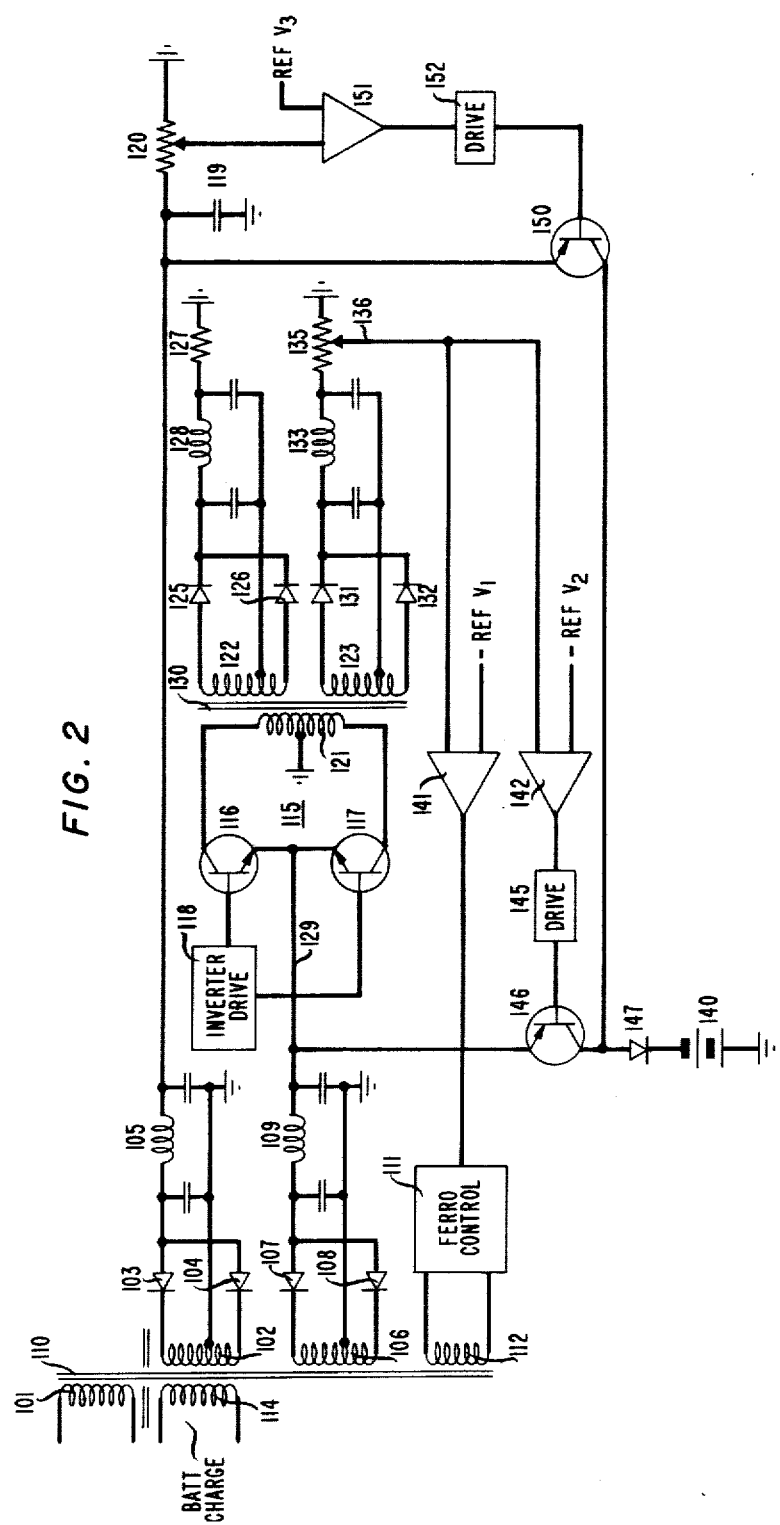
FIG. 2 is a schematic to illustrate the regulation control arrangement of an uninterruptible power supply designed in accord with the principles of the invention.

A regulatory arrangement, for an uninterruptible power supply embodying the principles of the invention, utilizing series regulators to regulate the voltage derived from the reserve voltage source is shown schematically in FIG. 2. Commercial AC power is applied to an input winding 101 of a controlled ferroresonant transformer 110. The transformer 110, as shown, is part of an electronically controlled ferroresonant voltage regulator, in which ferroresonant action is simulated in response to an electronic switching circuit. The electronic control designated herein as the ferro-control 111 is coupled to a separate winding 112 on the secondary side of the ferroresonant transformer structure 110. A first output winding 102 of the ferroresonant transformer 110 is coupled through a first pair of rectifying diodes 103, 104 and low-pass filter circuit 105 to an output load shown schematically by a resistor 120. A large capacitor 119, placed close to the output load 120, is charged to a negative DC voltage by the DC output of the low-pass filter 105 and serves to stabilize the voltage at the load 120 at some desired DC value.

A second output winding 106 of the controlled ferroresonant transformer 110 is coupled to a second pair of rectifying diodes 107, 108 and a second low-pass filter circuit 109. The DC output of the low-pass filter 109 is applied to the power input lead 129 of the inverter circuit 115. The inverter circuit 115 includes two oppositely phased switching transistors 116 and 117 alternately driven into conduction by a separate inverter drive circuit 118, shown here in block form. Since inverter drive circuits are well-known in the art, it is not believed necessary to disclose an inverter drive circuit in detail.

The inverter drive circuit 118 drives the two oppositely phased switching transistors 116 and 117 at a consistant 50 percent duty cycle, thereby applying a periodic inverted signal to the primary winding 121 of the inverter power transformer 130. Regulation of the inverter output voltage is obtained by regulating the voltage level of the DC power input signal on lead 129. The inverter power transformer 130, as shown, includes two output windings 122 and 123. Output winding 122 is coupled through rectifying diodes 125, 126 and low-pass filter 128 to energize load 127. Output winding 123 is coupled through rectifying diodes 131, 132 and low-pass filter 133 to energize load 135. Sensing means shown schematically by a wiper arm 136 connected to the output load 135 permits monitoring of this output voltage. While only two outputs are shown, it is to be understood that the inverter may have additional outputs which may be AC or DC loads, as needed.

An additional output winding 114 of the ferroresonant transformer 110 is coupled to a battery charger (not shown in FIG. 2) to keep the reserve DC voltage source 140 fully charged. Inasmuch as battery charger specifics are well-known in the art, a specific battery charger unit and its connection to the reserve DC voltage source is not described herein. Typically though, the battery charging circuitry would include a rectifier, filter and charging control circuitry to keep the reserve DC voltage source 140 in a fully charged condition. The reserve DC voltage source, shown as reserve battery voltage source 140, supplies the power to the various loads as described hereinbelow when the basic AC commercial power source is degraded or fails.

Control winding 112 of the ferroresonant transformer 110 is coupled to a ferro-control circuit 111, which includes an electronic switching arrangement to switch an inductance and capacitor (not shown) into the control winding circuit to simulate ferroresonant action in response to a feedback signal in order to regulate the output load voltage of the ferroresonant transformer. The details of the ferro-control are disclosed in the above-mentioned patent reference, hence, it is not believed necessary to disclose this circuitry since it is well-known in the art.

As is apparent from FIG. 2, the output load 120, supplied directly by the ferroresonant transformer 110, is not directly load regulated when the commercial AC power signal is normal but rather tracks the voltage of one of the output loads of the inverter circuit 115, which is coupled to be load regulated by the ferro-control 111. Output load 135 of the inverter circuit 115 is coupled through a sensing device shown by the sensing contact 136 to a comparator circuit 141, which is operative to supply an error signal to the ferro-control 111, wherein it is utilized to maintain a regulated output of the inverter 115 by controlling the DC input voltage level supplied by the ferroresonant transformer 110 and filter 109 to the power input terminal 129 of the inverter circuit 115.

Comparator circuit 141 has a first reference voltage $V_1$ coupled to it and the output signal of this comparator circuit 141 is an error signal which is applied to the ferro-control 111 to regulate the rectified DC output voltage of the ferroresonant transformer 110 and filter 109. The DC output voltage of inverter 115 at load 135 is also sensed and coupled to a second comparator circuit 142 which has a second reference voltage $V_2$ applied thereto. This second reference voltage $V_2$ is slightly lower in magnitude than the first reference voltage $V_1$ applied to the first comparator 141. This operates to keep the comparator 142 inactive when the primary AC power signal is normal and operating properly. The output of the second comparator 142 is coupled to a drive circuit 145 operative to control the bias of a series regulating transistor 146. Transistor 146 couples the output of the reserve battery source 140 to the power input of the inverter circuit 115. A diode 147, between the battery and the series regulating transistor, prevents reverse current flow from the rectified output of the low-pass filter 109 to the battery 140 in the event of a short circuit or grounding of the anode of diode 147.

It is apparent from the foregoing that when the primary AC power signal supplied to input 101 by the commercial power company is adequate to keep the load 135 properly energized at its regulated voltage magnitude, the feedback control is responsive to an output energized by the inverter circuit 115 to regulate this output through control of the controlled ferroresonant transformer. An error signal is generated by the first comparator 141, which is applied to the ferro-control 111 in order to regulate the output voltage at load 135. The voltages at loads 127 and 120, also supplied by the controlled ferroresonant regulator, track this regulated voltage.

During the normal operating condition, the series regulating transistor 146 coupling the emergency DC voltage source 140 to the power input 129 of inverter 115 and the series regulating transistor 150 coupled to the first load 120 are both biased in a nonconducting condition. The first series regulating transistor 146 coupling the emergency DC voltage source 140 to the power input 129 of inverter 115 is biased in an off condition because the output voltage at load 135 is greater than the reference voltage $V_2$ applied to the comparator 142 and hence, no error signal is applied to the drive circuit 145. Similarly, the series regulating transistor 150 coupling the emergency DC voltage source 140 to the load 120 is biased in a nonconducting condition since the output voltage exceeds the reference voltage $V_3$ applied to comparator 151.

When the primary AC power signal fails or is significantly degraded due to a brownout, the DC output voltages at the loads 120 and 135 begin to instantly drop in magnitude in response to this AC failure or brownout. This drop in the output voltage enables a generation of error signals by comparators 142 and 151 in response thereto which operate to bring the series regulating devices 146 and 150 into active operation to supply a regulated reserve DC voltage therethrough to the respective loads.

In the case of the load 120, the DC output voltage drops slowly because of the voltage stored on the capacitor 119; however, as the voltage drops below the reference voltage $V_3$ applied to the comparator 151, an error signal is generated which is applied to the drive circuit 152 of the series regulating transistor 150 and the series regulating transistor 150 is biased into its active conducting condition in such a fashion as to conduct a controlled current from the ground through the output load 120 and through diode 147 to the negative terminal of the reserve DC voltage source 140. The output voltage of load 120 is continuously compared by comparator 151 with the reference voltage $V_3$ and series regulating transistor 150 is regulated so that a regulated voltage is maintained at the output load 120.

The same mode of operation occurs with respect to the output voltage at load 135 supplied through the inverter circuit 115. Upon failure or brownout of the primary AC signal, the output voltage at load 135 drops below reference voltage $V_2$ whereupon the comparator 142 becomes operative thereby applying an error signal to the drive circuit 145, which in turn, biases the series regulating transistor 146 into its active conductive condition permitting a flow of current from the power input of the inverter circuit through the diode 147 and series regulating transistor 146 to the reserve DC voltage source 140. This signal is regulated in response to the error signal output of the second comparator 142 so that the output voltage signal at the output load 135 of the inverter 115 is continuously regulated at its desired value.

The reserve DC voltage source 140 may take many different forms; it may comprise a large battery which will provide reserve energy for a long period of time; or it may consist of a few small sealed lead acid cells to provide a few minutes duration of reserve power for temporary interruptions in the primary AC power.

It is readily apparent from the foregoing that the output loads are supplied by a regulated voltage during failure or brownout of the primary AC power signal by a reserve DC voltage source through series regulator devices. During the periods when the AC primary power signal is normal, regulation is supplied by the regulatory action of the controlled ferroresonant transformer. It is apparent that many varied approaches and schemes to achieve uninterruptible power supplies utilizing the principles of the invention may be devised by those skilled in the art without departing from the spirit and scope of this invention.

We claim:
1. An uninterruptible power supply comprising;
input means (9) to accept an AC power source,
a controlled ferroresonant regulator (10) coupled to the input means and energized by the AC power source, a rectifier (14) coupled to the ferroresonant regulator to derive a first rectified DC voltage therefrom, an inverter (20) energized by the first rectified DC voltage, output means to accept a load (28) energized by a second rectified DC voltage output of the inverter,
characterized by
a voltage sensor (27) coupled to sense a voltage of the load and to a ferro-control (25) to control the controlled ferroresonant regulator and regulate the second rectified DC voltage output of the inverter at a first magnitude level by controlling a DC voltage level of the first rectified DC voltage, a voltage regulation circuit (32) including second input means adapted to accept a reserve DC voltage source (16) and output means to couple it to the inverter, the voltage regulation circuit responding to the voltage sensor when the voltage level of the second rectified DC voltage output drops below the first magnitude level and operative to amplitude modulate and couple a voltage level supplied by the reserve DC voltage source to the inverter and control a DC voltage level of a voltage applied to the inverter level so that a third rectified DC voltage output of the inverter at the load is slightly lower in magnitude than the first magnitude level of the second rectified DC voltage output occurring at the load in response to the controlled ferroresonant regulator, whereby a failure in the primary power source enables the voltage regulator circuit to insure a continued DC voltage at the load.

2. An uninterruptible power supply as defined in claim 1 and further,
characterized by
said voltage sensor is coupled to a first comparator (141) responsive to a first threshold voltage ($V_1$) to apply an error signal to the ferro-control (111) and to a second comparator (142) responsive to a second threshold voltage ($V_2$) slightly lower in magnitude than the first threshold voltage and applying an error signal to a drive circuit (145) operative to control a series regulating device (146) which couples the reserve DC voltage source including a battery (140) to a power input (129) of an inverter (115).

3. An uninterruptible power supply as defined in claim 2 further,
characterized by
a protective diode (147) included to couple the battery to the series regulating device to protect against short circuits.

4. An uninterruptible power supply as defined in claim 2 wherein;
a second output load (120) is directly energized by a third rectified voltage output of the controlled ferroresonant regulator (110) and further,
characterized by
a third comparator (151) responsive to a voltage at the second output load and coupled to a voltage threshold ($V_3$) slightly lower in magnitude than a normal regulated output voltage at the second load, and a second series regulating device (150) responsive through drive circuit (152) to an error signal output of the third comparator and operative to modulate and couple a voltage output of the battery to the second load.

5. An uninterruptible power supply system comprising;
first input means for accepting a primary AC power source,
first regulating means coupled to said first input means and adapted for deriving a first amplitude controlled DC voltage from the primary AC power source,
second input means for accepting a reserve DC power source,
second regulating means coupled to said second input means and adapted fo deriving a second amplitude controlled DC voltage from the reserve DC power source,
converter circuitry to connect the first and second amplitude controlled DC voltages to an output means to accept a load,
sensing means for monitoring a DC output voltage at the load, and
first and second control means responsive to the sensing means for controlling a first and second signal amplitude control of the first and second regulating means, first feedback means operative to cause the first regulating means to derive a first regulated DC output voltage at the load from the first amplitude controlled DC voltage and second feedback means operative to cause the second regulating means to derive a second regulated DC output voltage at the load from the second amplitude controlled DC voltage, the second regulated DC output voltage lower in magnitude than the first regulated DC output voltage and being enabled by the second control means when a magnitude drop in the DC output voltage sensed at the load indicates a failure of the primary AC power source.

6. An uninterruptible power supply system as defined in claim 5 wherein;
said first regulating means comprises a controlled ferroresonant regulator,
said second regulating means comprises a series regulating transistor coupling a reserve DC power source to the load, and
the first feedback means includes the first comparator responsive to an output of the sensing means and a first reference voltage and an output of the first comparator being coupled to control the controlled ferroresonant regulator and the second feedback means includes a second comparator responsive to an output of the sensing means and a second reference voltage slightly lower in magnitude than the first reference voltage and an output of the second comparator being coupled to control the series regulating transistor whereby the second comparator is inoperative to bias the series regulating transistor conductive when a voltage at the load is at the first regulated DC output voltage.

7. An uninterruptible power supply system comprising;
a signal inverting means operative for deriving at least a first output signal,
a primary regulated power source responsive to AC power input and coupled to an input of the said signal inverting means said primary regulated power source being regulated in response to a first error signal generated by comparing the first output signal to a first reference voltage,
a reserve power source responsive to DC power input and coupled to the input of said signal inverting means and including signal level adjustment means, and
signal regulation means including control means for controlling the signal level adjustment means, said signal regulation means being responsive to a second error signal generated by comparing the first output signal with a second reference voltage lower in magnitude than said first reference voltage, whereby the signal regulation means is responsive to a reduction in magnitude of the first output signal, indicating a failure of the primary power source and operative to supply uninterrupted power to the load from the reserve power source.

8. An uninterruptible power supply system as defined in claim 7 wherein:
the primary regulated power source comprises;
a controlled ferroresonant regulator including means for energizing a second load with a second output signal, and
said reserve power source further comprising second signal level adjustment means coupled to the second load and including second signal regulation means including second control means for controlling the second signal level adjustment means and operative in response to a reduction in magnitude of the second output signal.

* * * * *